United States Patent [19]

Feiner et al.

[11] 4,228,323
[45] Oct. 14, 1980

[54] VARIABLE LOOP LENGTH COMPENSATED BARRIER CIRCUIT

[75] Inventors: Alexander Feiner, Rumson; Chao Kai Liu, Matawan; Sigurd G. Waaben, Princeton, all of N.J.

[73] Assignee: Bell Telephone Laboratories, Incorporated, Murray Hill, N.J.

[21] Appl. No.: 8,194

[22] Filed: Jan. 31, 1979

Related U.S. Application Data

[63] Continuation of Ser. No. 893,794, Apr. 5, 1978, abandoned.

[51] Int. Cl.² ............................................. H04B 9/00
[52] U.S. Cl. .............................. 179/16 F; 179/170 R; 250/551; 307/311; 455/602
[58] Field of Search ............... 307/311; 250/199, 205, 250/551; 179/1 C, 2 C, 16 F, 18 F, 18 FA, 81 C, 170 R

[56] References Cited

U.S. PATENT DOCUMENTS

| | | | |
|---|---|---|---|
| 3,504,127 | 3/1970 | Slana | 179/16 F |
| 3,772,514 | 11/1973 | Sunderland | 250/217 S |
| 3,952,205 | 4/1976 | Tobey, Jr. et al. | 250/551 |
| 3,991,279 | 11/1976 | Morgan | 179/18 BC |
| 4,032,843 | 6/1977 | Loucks | 250/551 |
| 4,045,615 | 8/1977 | James | 179/1 CN |
| 4,056,719 | 11/1977 | Waaben | 250/199 |
| 4,070,572 | 1/1978 | Summerhayes | 250/199 |

*Primary Examiner*—James W. Moffitt
*Assistant Examiner*—Randall P. Myers
*Attorney, Agent, or Firm*—David H. Tannenbaum

[57] ABSTRACT

A gain and frequency compensated barrier circuit is disclosed for use with a telephone transmission line having variable loop lengths. A DC component of the input signal is provided to the input side of the barrier circuit. Loop length losses, as well as barrier gain variations, are adjusted on the output side of the circuit by comparing a barrier DC voltage level with a DC reference level and adjusting the AC gain in accordance therewith. Frequency response, which is also a function of loop length, is corrected by using the DC input voltage to generate an effective loop length dependent capacitor for further controlling the output signal level. An optocoupled circuit is disclosed for use in one embodiment of the disclosure.

16 Claims, 22 Drawing Figures

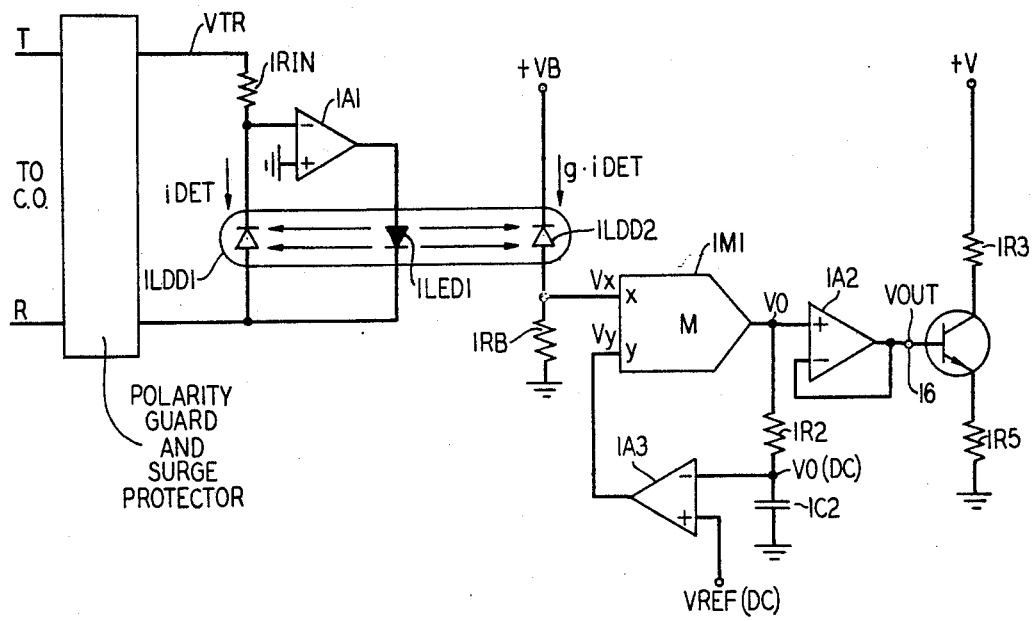

FIG. 1

FIG. 2  $i_{DET}(AC) = \frac{V_{TR}(AC)}{I_{RIN}}$, $i_{DET}(DC) = \frac{V_{TR}(DC)}{I_{RIN}}$ $V_O(DC) = g \cdot i_{DET}(DC) \cdot I_{RB} \cdot V_y \cdot M$ ; BUT $V_O(DC) = V_{REF}(DC)$ $\therefore V_y = \frac{V_{REF}(DC)}{g \cdot i_{DET}(DC) \cdot I_{RB} \cdot M}$ FIG. 3  $V_O(AC) = g \cdot i_{DET}(AC) \cdot I_{RB} \cdot M \cdot \frac{V_{REF}(DC)}{g \cdot i_{DET}(DC) \cdot I_{RB} \cdot M}$ $V_O(AC) = i_{DET}(AC) \cdot \frac{V_{REF}(DC)}{i_{DET}(DC)}$ \hfill (1)

$V_O(AC) = V_{TR}(AC) \cdot \frac{V_{REF}(DC)}{V_{TR}(DC)}$ \hfill (2)

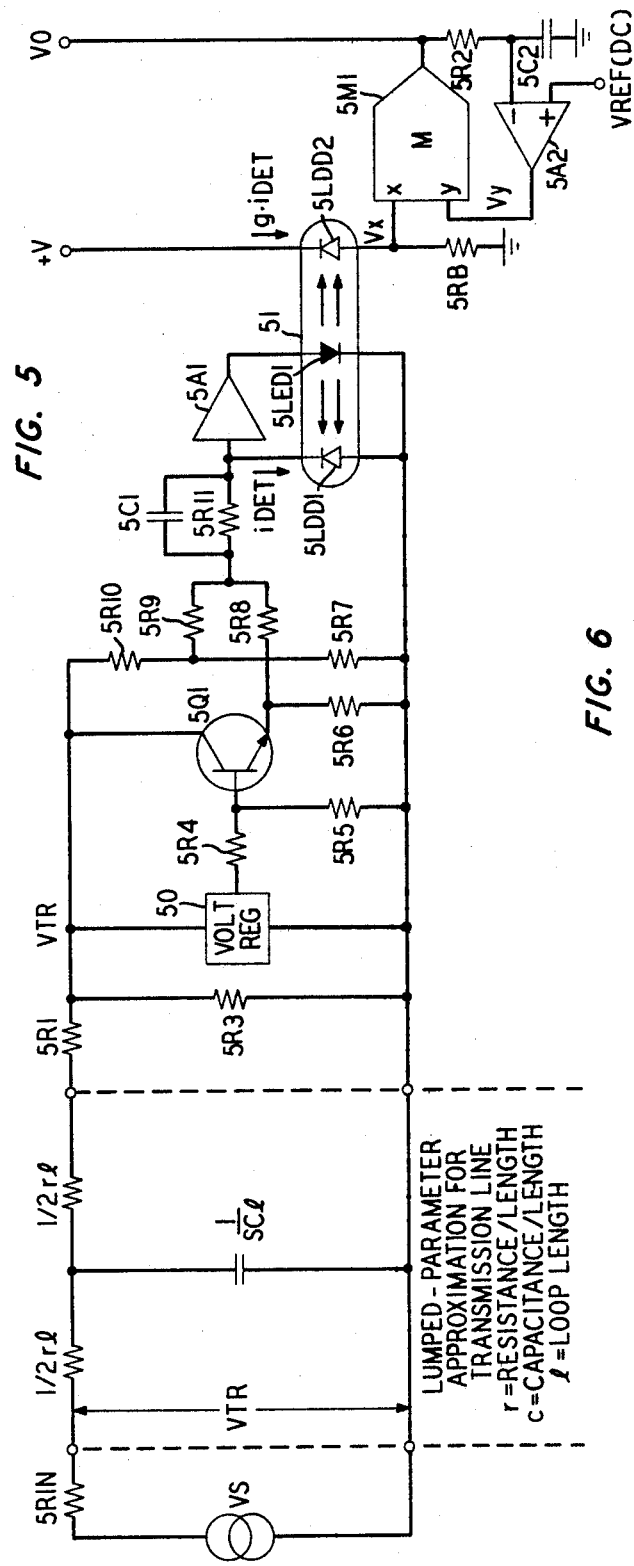

$V_{TR}(AC) = V_S \cdot G(S)$
WHERE $G(S)$ IS THE TRANSFER FUNCTION OF THE LINE $$G(S) = \frac{0.6}{(1.57 + r\ell)(1 + 1/2\, SC\ell R)} \text{ WHERE } R = 0.9 + 1/2\, r\ell$$

$V_{TR}(AC) = V_S \cdot G(S)$ $i_{DET}(DC) = \dfrac{K1}{1.07 + r\ell}$  (K1 AND K2 ARE CONSTANTS)

$i_{DET}(AC) = V_{TR}(AC) \cdot K2$ $V_O(AC) = i_{DET}(AC) \cdot \dfrac{V_{REF}(DC)}{i_{DET}(DC)} \cdot K3$  (K3 IS A CONSTANT)  (FROM FIG. 3) EQUAT. (1)

$(1) \therefore V_O(AC) = \dfrac{V_S \cdot (1.07 + r\ell)}{(1.57 + r\ell)(1 + 1/2\, SC\ell R)}$

NO FREQUENCY EQUALIZATION

FIG. 7
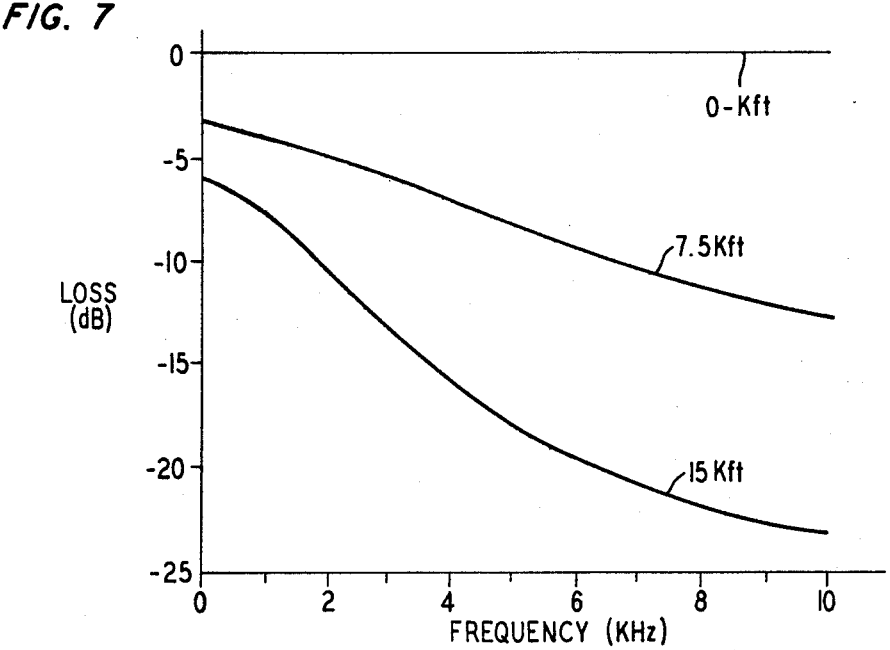
FIG. 8
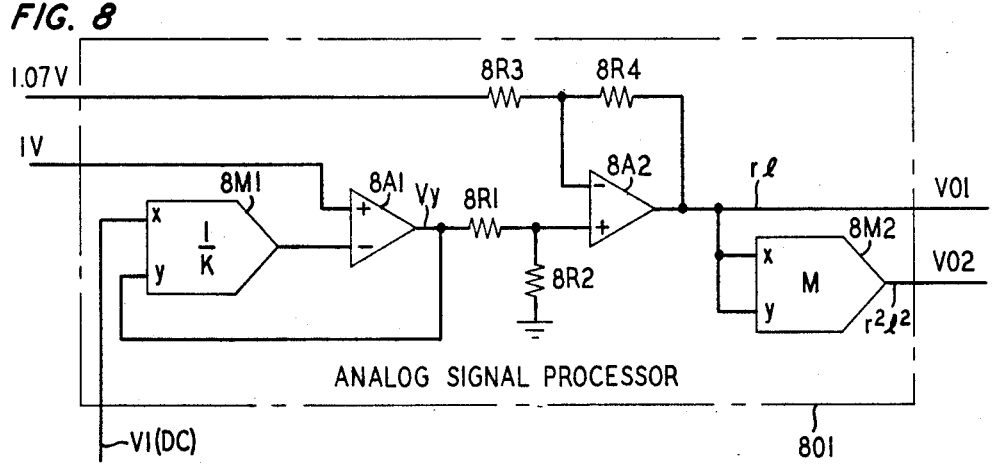
ANALOG SIGNAL PROCESSOR
FIG. 9
(1) $VI(DC) = \dfrac{K}{1.07 + r\ell}$
$\dfrac{1}{K} \cdot V_y \cdot VI(DC) = 1$
$V_y = \dfrac{K}{VI(DC)} = 1.07 + r\ell$
$VOI = V_y - 1.07 = r\ell$
$VO2 = (VOI)^2 = r^2 \ell^2$

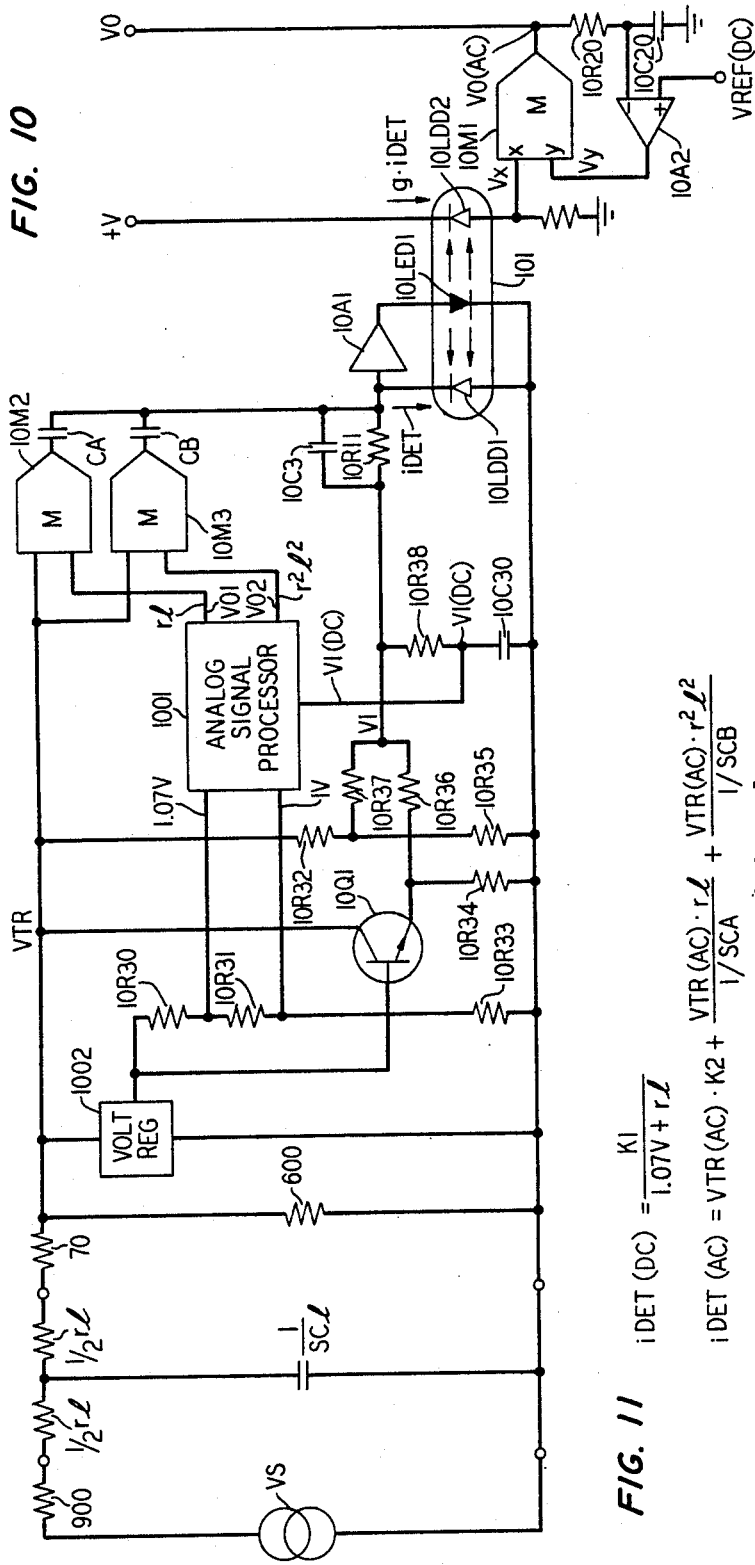

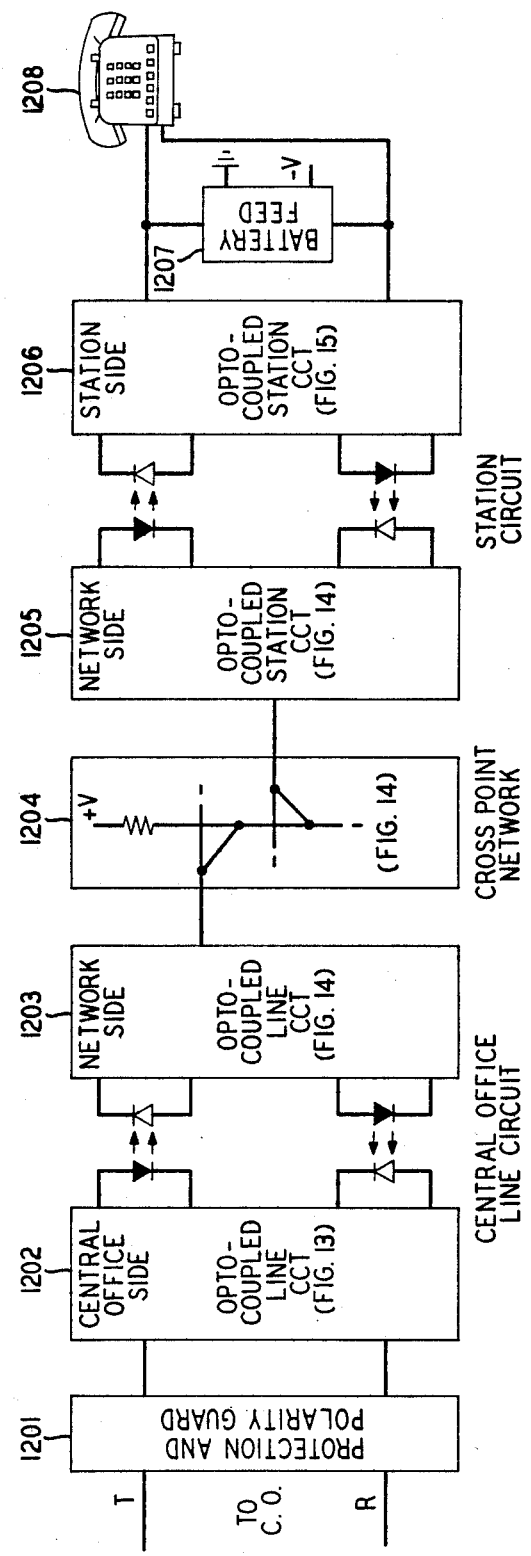
FIG. 12 OPTO-COUPLED LINE AND STATION CIRCUITS

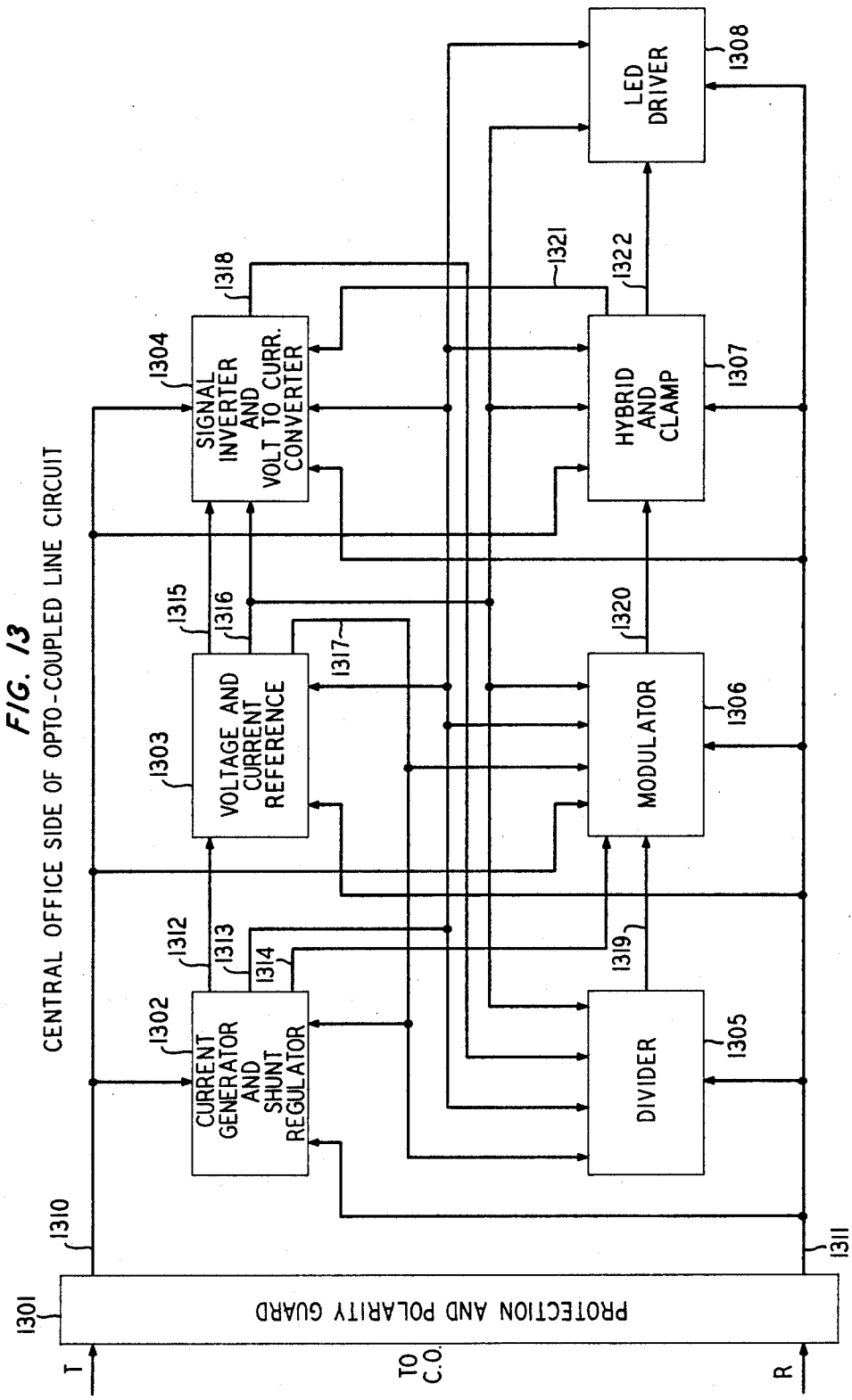
FIG. 13 CENTRAL OFFICE SIDE OF OPTO-COUPLED LINE CIRCUIT

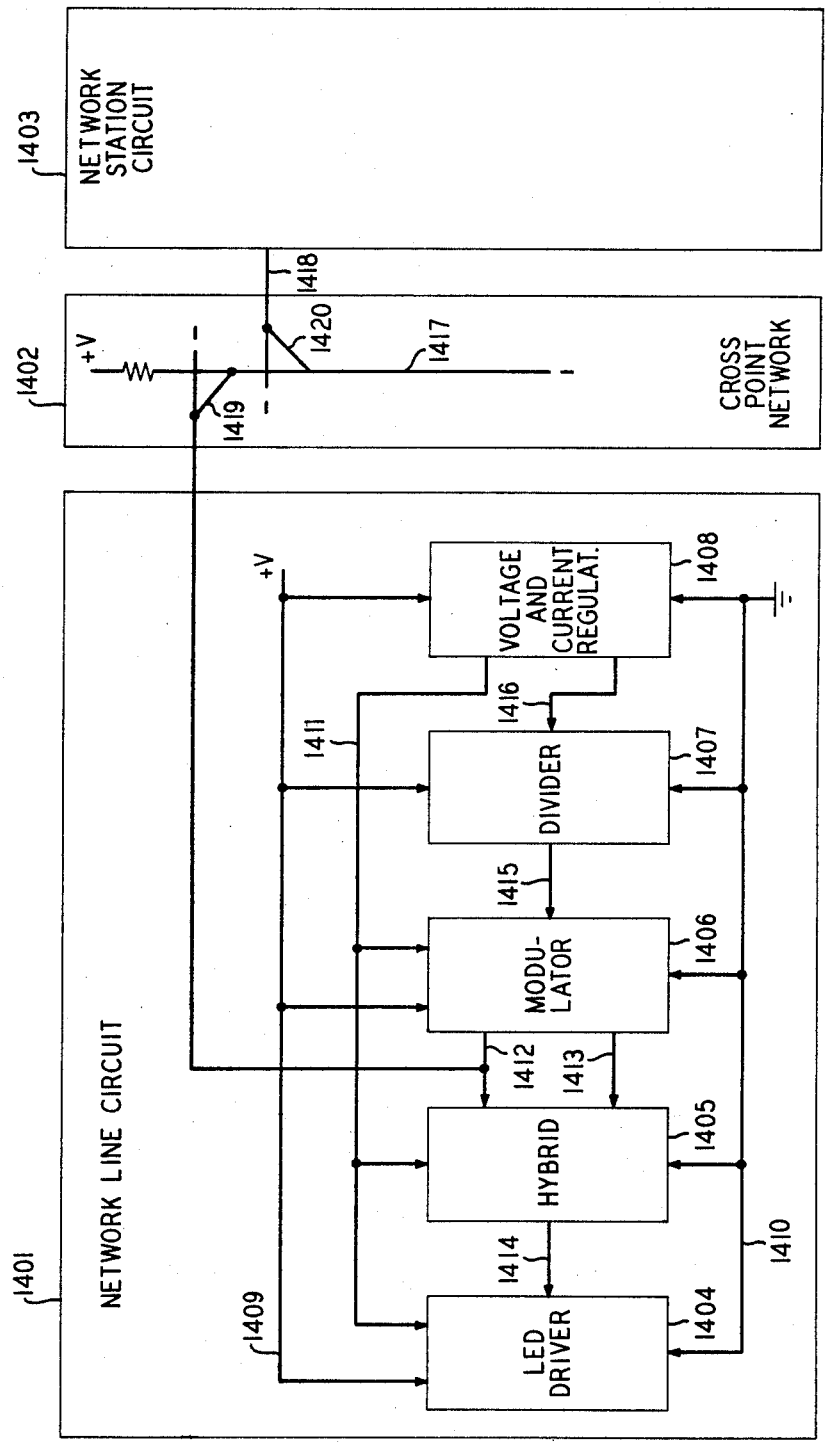
FIG. 14 NETWORK OPTO-COUPLED LINE AND STATION CIRCUITS

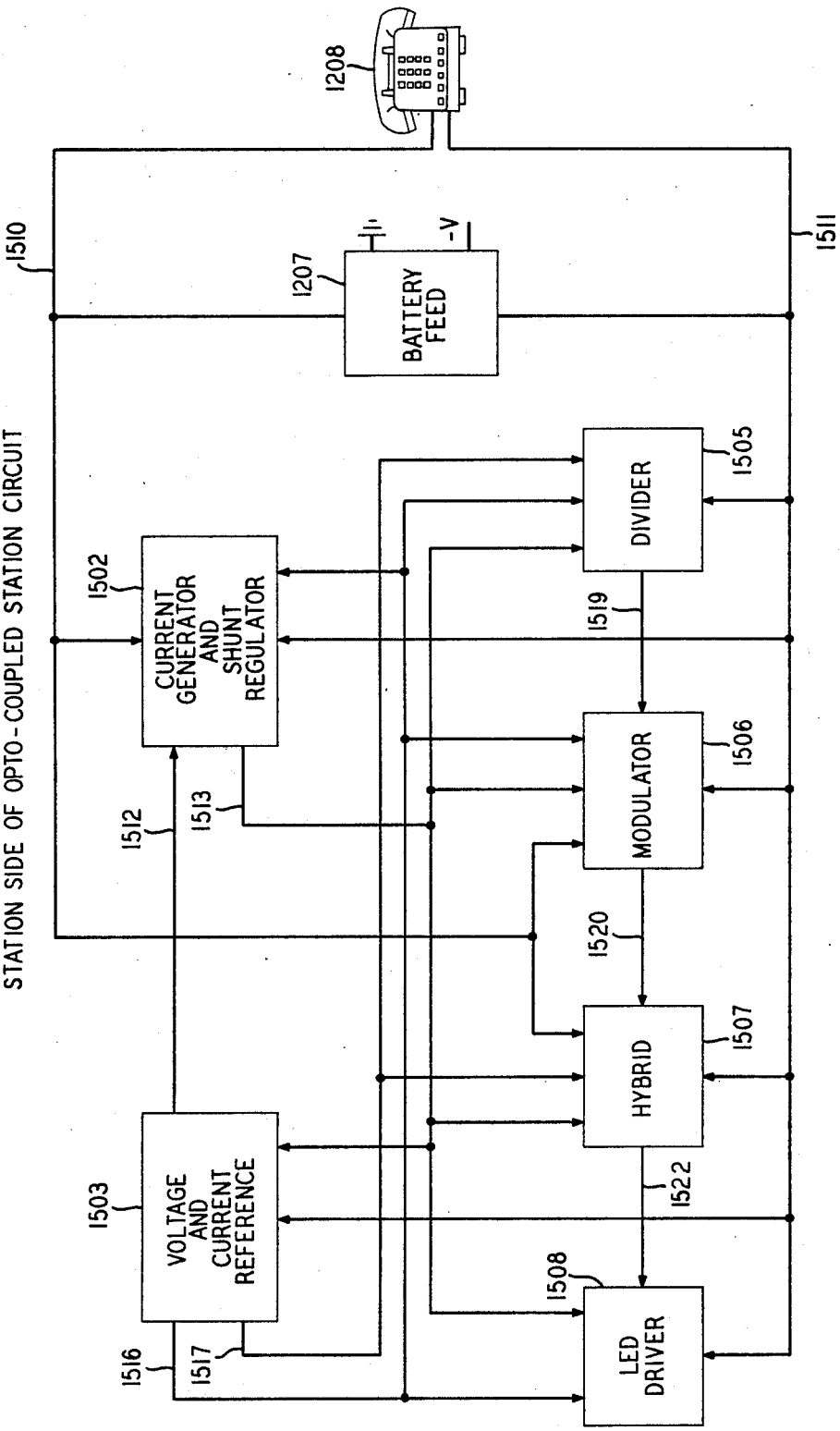

LED DRIVER CIRCUIT 1308 1409 AND 1508

HYBRID CIRCUIT 1307 AND 1507

HYBRID 1405

MODULATOR 1406 AND 1506

4,228,323

VARIABLE LOOP LENGTH COMPENSATED BARRIER CIRCUIT

This application is a continuation of application Ser. No. 893,794, filed Apr. 5, 1978 now abandoned.

BACKGROUND OF THE INVENTION

1. Technical Field

This invention relates to electrical isolation devices and particularly to an improved optocoupler device having an output gain dependent upon loop length.

2. Background Art

It has become known that it is possible to design an isolation device for passing signals from an input to an output using optocoupling at the barrier between the input and output terminals. Such a device is the subject of U.S. Pat. No. 4,056,719 issued to S. G. Waaben on Nov. 1, 1977. The Waaben patent provides a solution to the problems of linearity of the output signal with respect to the input signal. Under the Waaben teaching a pair of light detecting diodes and a LED (light emitting diode) are used in a feedback arrangement such that the light output characteristics of the photodetector in the output circuit linearly track input signal. Thus, as taught by Waaben, an optocoupler can be built that corrects for light output differences between the LED and the photodiodes as well as corrects for temperature coefficient differences between devices.

In our concurrently filed copending patent application, Ser. No. 893,795, now abandoned, we have disclosed an arrangement for gain controlling the optocoupled circuit under control of a DC reference voltage in the output circuit. This copending application is hereby incorporated into and made a part hereof by reference thereto.

As discussed in our aforementioned patent application, one usage of the optocoupled device is as a barrier between the input and output sides of a telephone line for isolation purposes. The use of our device in such a manner solves many of the problems inherent with such isolation devices. However, a problem that exists in all transmission lines is that as the loop length increases the quality of the transmission deteriorates. This deterioration is related to the resistance of the line itself and is manifested in a drop in the DC voltage level from one end of the line to the other. In addition, as the length of the transmission line increases there is a fall off in signal gain due to the frequency of the transmission.

Accordingly, a need exists in the art for a circuit capable of automatically correcting for changes in loop length. A further need exists for a circuit capable of correcting both the AC and DC transmission signals passing over variable length lines.

SUMMARY OF THE INVENTION

In one embodiment of our invention the DC line voltage, which is attenuated by the transmission line resistance, is applied to the input side of an optocoupled circuit. The DC line voltage is used to generate DC bias current in the input photodiode, such that the output side photodetector contains a bias current dependent upon the line length. The output side of the optocoupled barrier is arranged, as discussed in our aforementioned application such that a DC reference voltage is used to adjust the AC gain based upon the difference between the reference voltage and the DC generated bias voltage. Thus, the circuit is automatically, and continuously, corrected for changes in transmission line lengths.

In a second embodiment of our invention a compound DC bias voltage dependent upon loop length is generated on the input side of the barrier. This compound voltage is used to control the effective value of a capacitor thereby compensating for changes in frequency such that the frequency response of the circuit is approximately constant over a wide range of frequencies and line lengths. The compound voltage is applied to the input side photodiode and communicated to the output circuit in order to cancel the frequency component of the output AC signal, making the output circuit frequency insensitive.

Accordingly, it is a feature of our invention to construct an optocoupled circuit for automatically compensating for transmission line length changes.

It is a further feature of our invention to arrange such an optocoupled circuit with a DC reference voltage in the output circuit for correcting the output AC signal for signal losses due to the resistance of the input transmission line.

It is still a further feature of our invention to arrange such a circuit with a compound voltage, derived from the input signal to correct the output signal for losses due to the frequency dependent characteristic of the transmission line.

DESCRIPTION OF THE DRAWING

These features and objects of our invention will be more fully appreciated from a review of the drawings in which:

FIG. 1 shows a loop length corrected optocoupled device.

FIGS. 2 and 3 show equations pertaining to FIG. 1,

FIG. 5 shows the equivalent circuit for a DC corrected optocoupled device,

FIG. 6 shows the equations pertaining to FIG. 5,

FIG. 7 is a graph showing the fall off and gain as a function of frequency,

FIG. 8 is an analog signal processor,

FIG. 9 shows the equations pertaining to FIG. 8,

FIG. 10 is an equivalent circuit showing both AC and DC loop correction,

FIG. 11 are the equations pertaining to FIG. 10,

FIGS. 12 through 15 are block diagrams showing the use of a loop length compensated optocoupled device in a telephone system.

DETAILED DESCRIPTION

Figure 4:
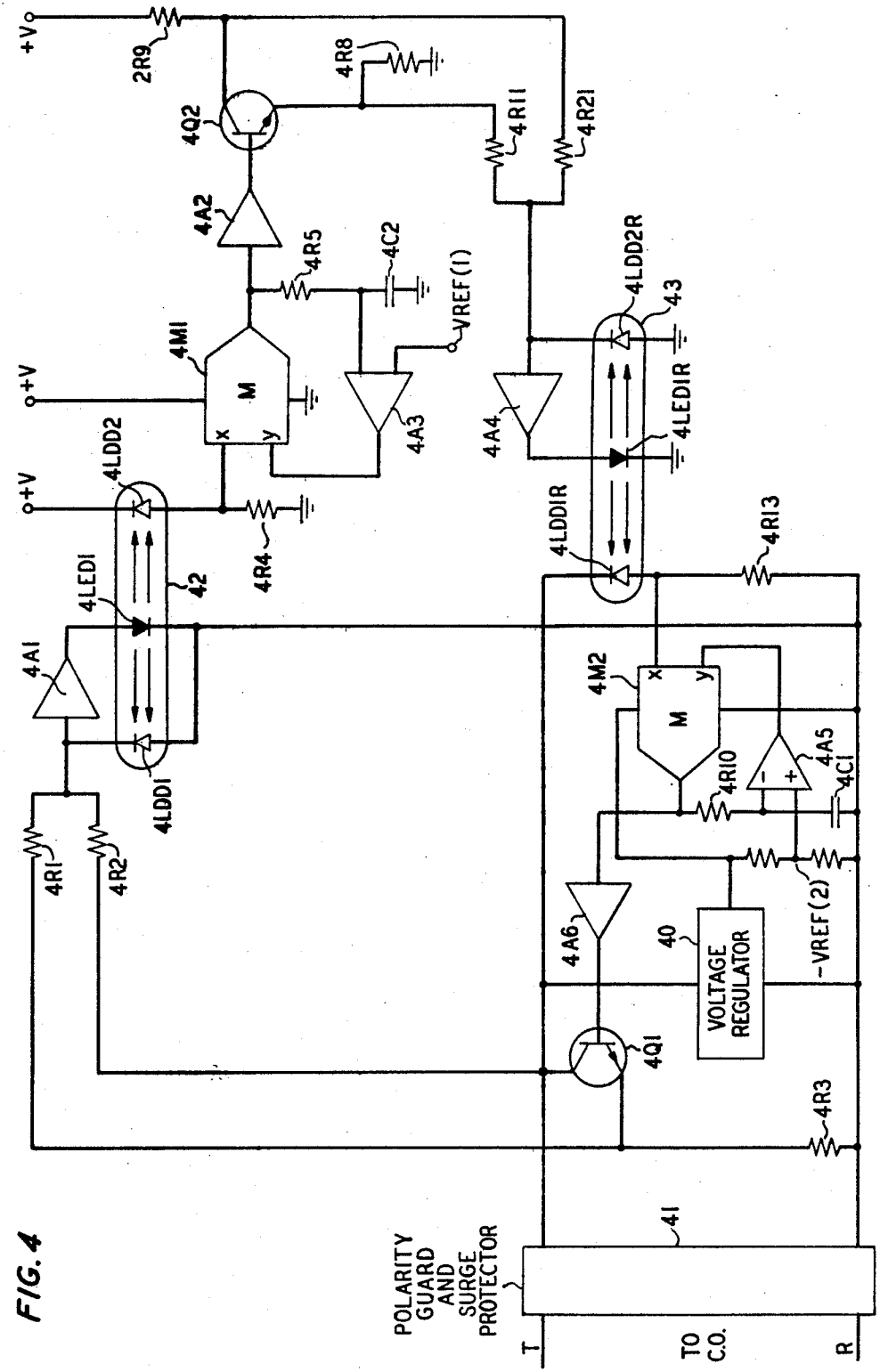
FIG. 4 shows a loop length corrected 2-way device.
Figure 16:
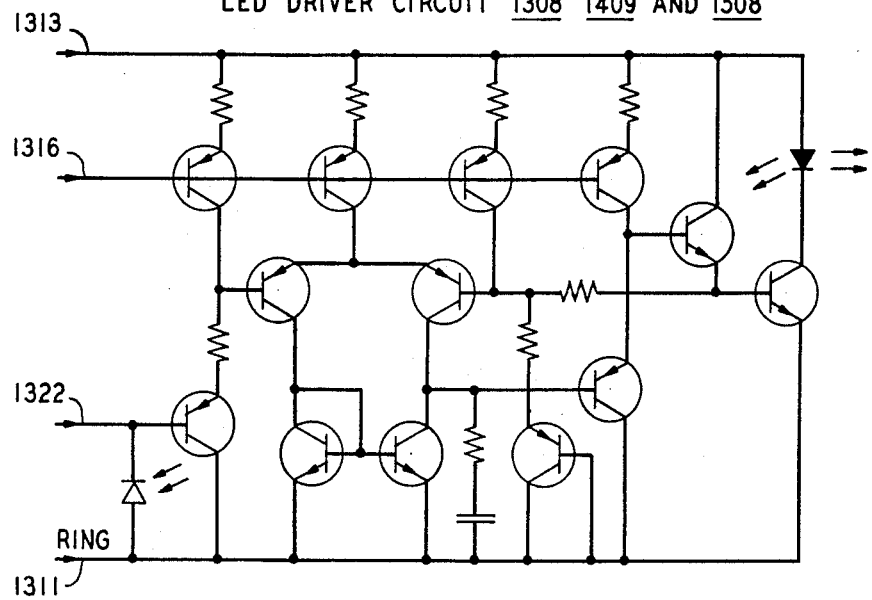
FIGS. 16 through 22 show details of the circuit blocks of FIGS. 12 through 15.
Figure 17:
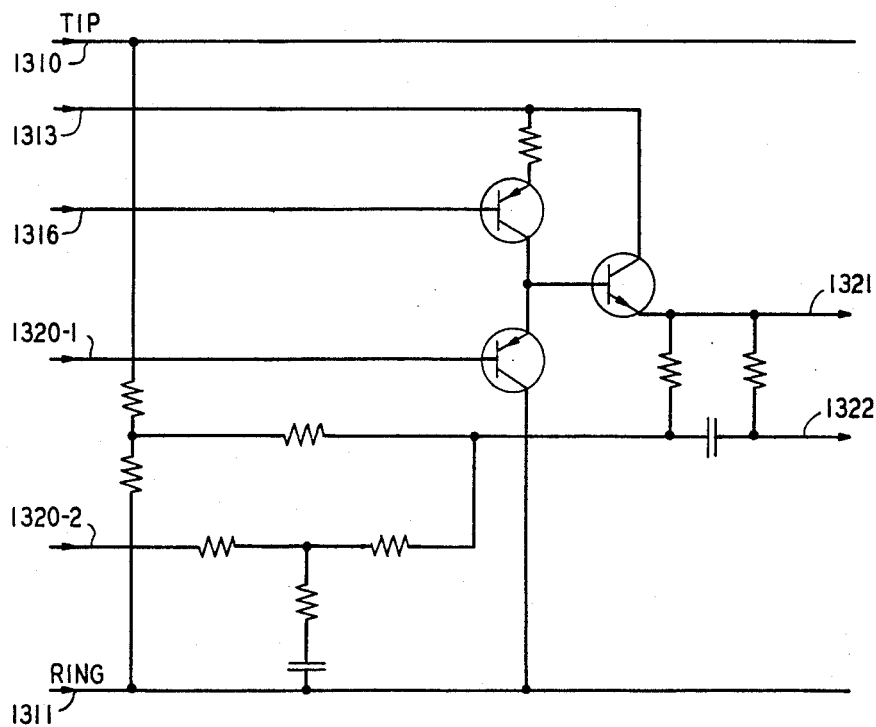
Figure 18:
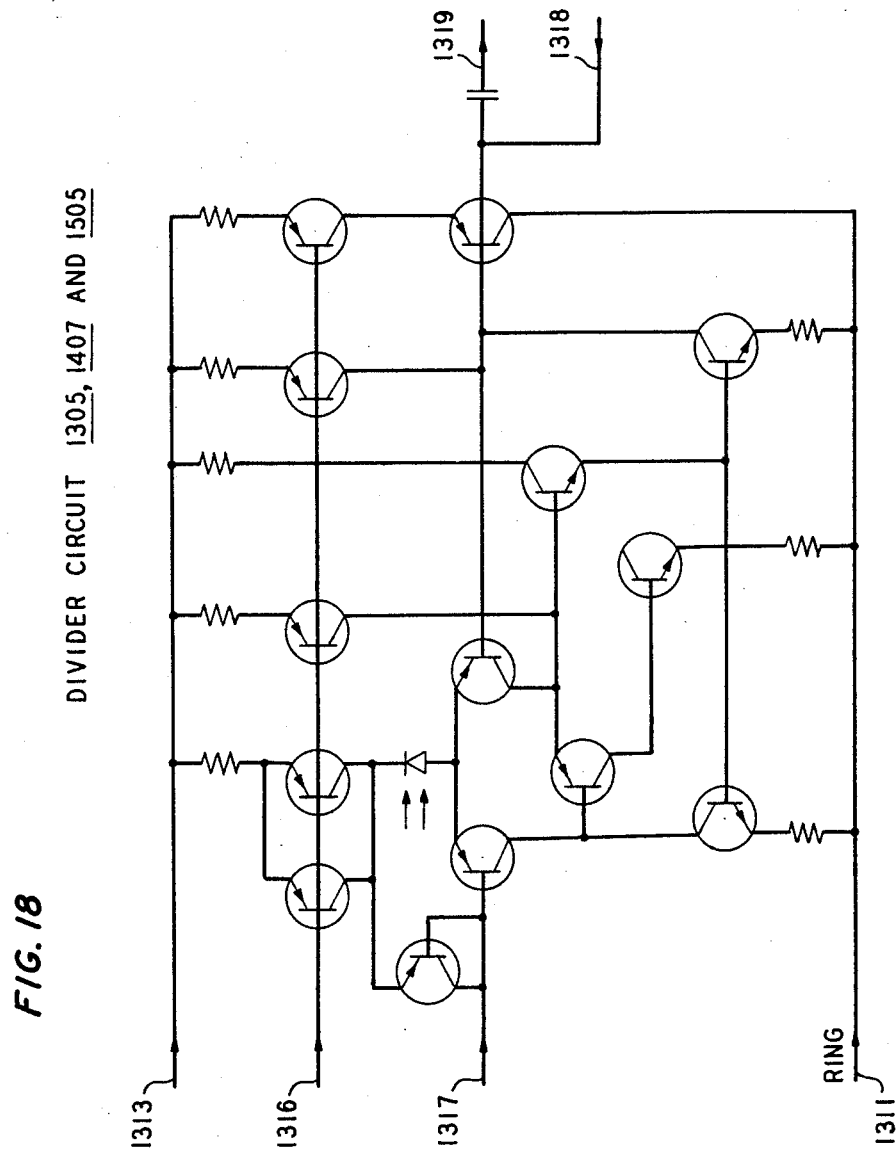
Figure 19:
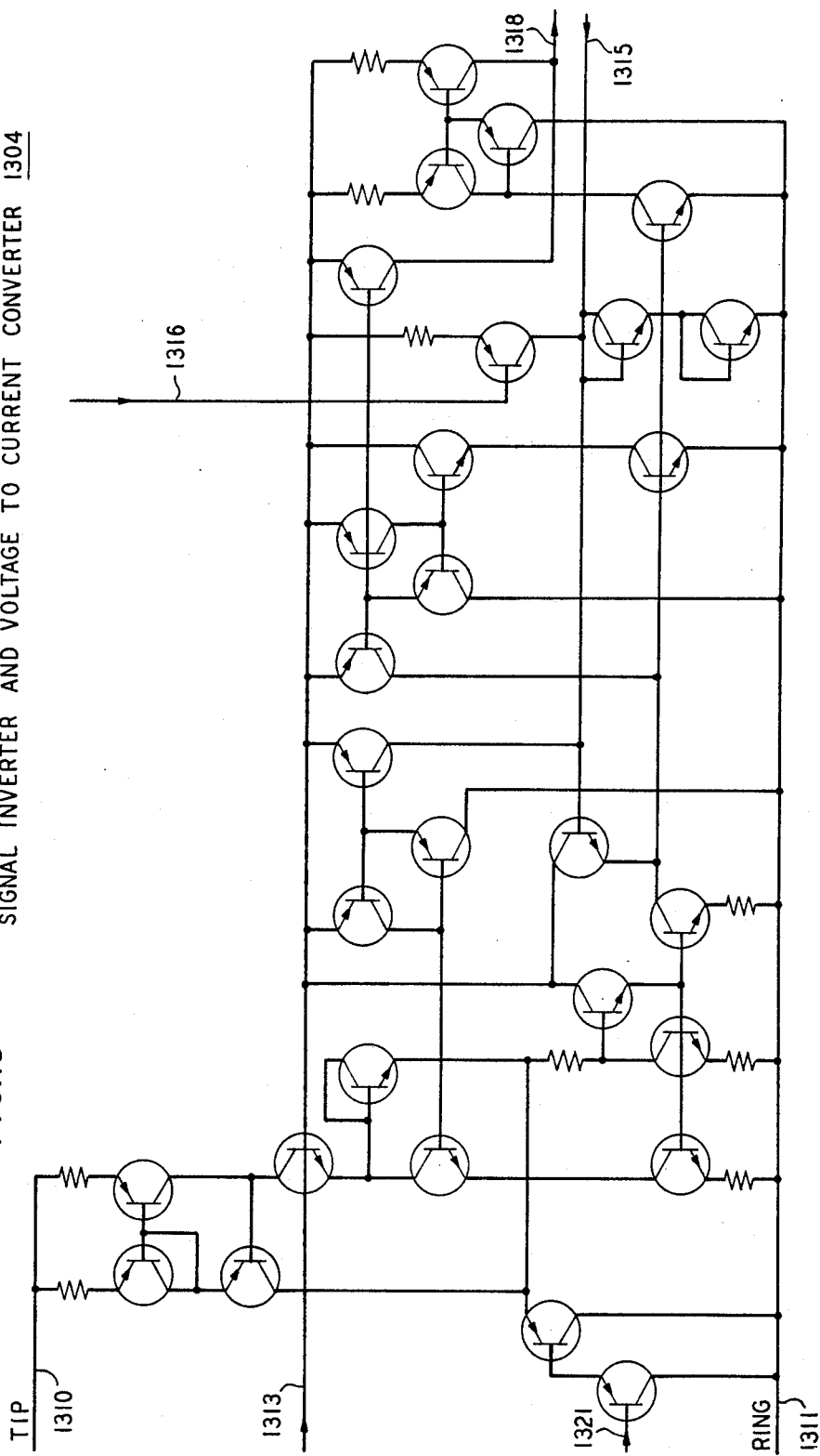
Figure 20:
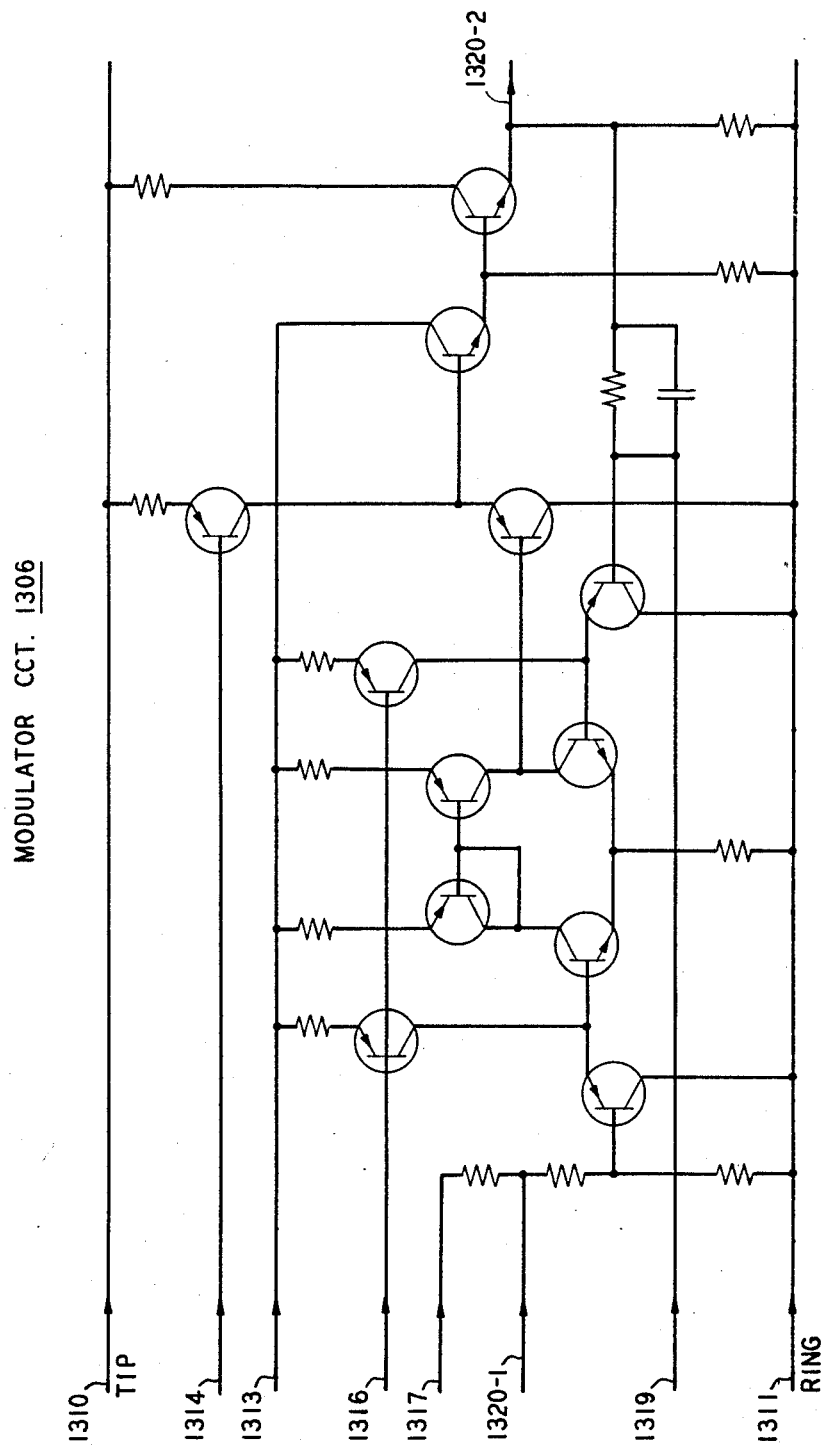
Figure 21:
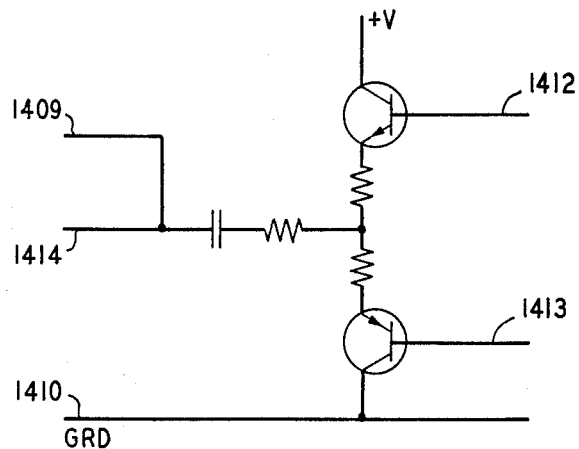
Figure 22:
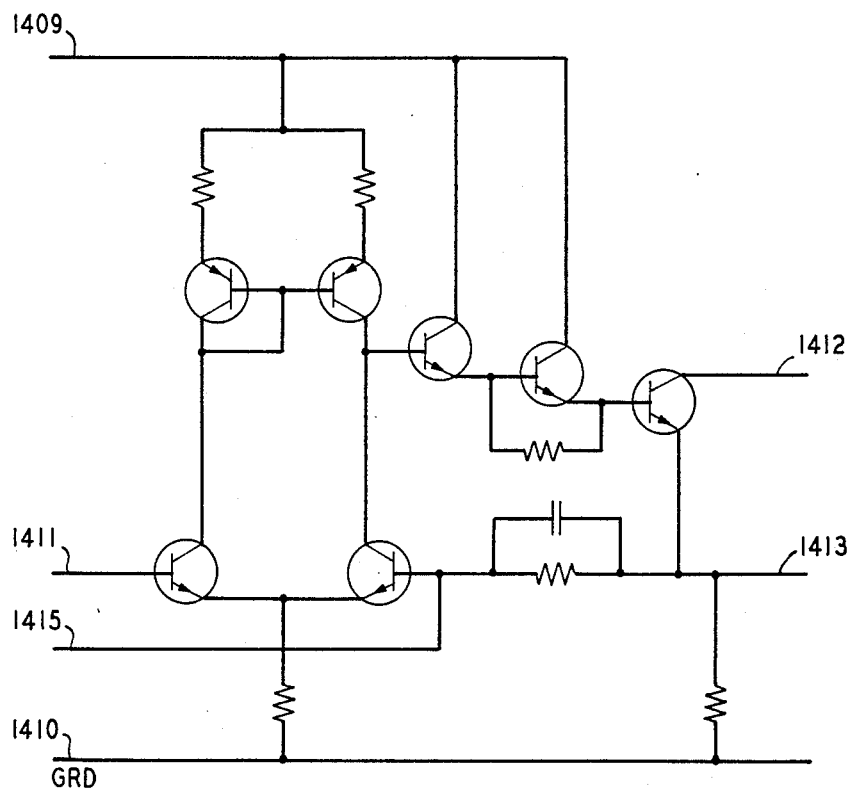

Prior to discussing the operation of our invention it may be helpful to understand the operation of prior art linear optocoupled devices. In this respect S. G. Waaben U.S. Pat. No. 4,056,719 dated Nov. 1, 1977 may be helpful. The aforementioned Waaben patent is hereby incorporated by reference into this application. The Waaben patent is discussed in our concurrently filed copending application entitled Signal Corrected Optocoupled Device which is also incorporated by reference herein. As discussed in our copending application and with reference to FIG. 1 hereof, the output side of the light barrier operates exactly in the manner as discussed in our copending application. The output side is designed to take advantage of the characteristic of light coupled devices where the DC gain of the light detecting diode 1LDD2 tracks almost identically to the AC gain of that light detecting diode over a substantial range of operating currents. Thus, the output of the device operates by comparing the DC signal of light detecting diode 1LDD2 with a known DC reference signal, thereby making it possible to control the AC output gain of the circuit.

In our said copending application the DC bias voltage on the input side of the barrier was fixed at a certain level. This DC level was transmitted across the barrier as a steady state DC value passing through light detecting diode 1LDD2. Accordingly, as discussed in our copending application, the only change in DC current on the output side of the barrier resulted from the actual physical light transfer characteristics of the optocoupled device itself. Thus by comparing the DC output voltage to the reference voltage and by adjusting the AC gain of the output circuit accordingly, the circuit is compensatable for changes in light transfer characteristics of the optocoupled device.

We have recognized that if the input DC bias becomes a function of loop length, then as the loop length increases (decreasing loop current) the DC bias voltage would decrease. This decrease in DC bias voltage is then transmitted across the light barrier and becomes a factor in the DC output voltage. This DC output voltage is compared to the DC reference voltage and the AC signal output is gain compensated both for the light barrier transfer characteristics (which is one factor in the DC output current) and for the loop length change (which is a second factor in the DC output current).

Thus as shown in FIG. 1 the DC voltage of the tip and ring leads of the line loop, which voltage is reduced as the loop from the central office or other switching machine increases, determines the DC voltage drop across resistor 1RIN. The voltage drop across resistor 1RIN determines the DC bias which in turn controls the DC current which flows through photodiode 1LDD-1. This DC bias is then transmitted across the light barrier causing voltage V×(DC) to have a component dependent on the loop length.

FIG. 2 shows the DC voltages of FIG. 1.

As discussed in our aforementioned copending application, amplifier 1A3 is an open loop comparator and is arranged in conjunction with multiplier 1M1 in a closed loop feedback circuit such that VO(DC) equals the DC reference voltage VREF(DC). Multiplier 1M1 can be constructed in any one of the well known circuit configurations such as RCA CA3091D. Amplifier 1A2 is a voltage follower. Of course, it is known that the multiplier can be substituted for by a divider with proper inversion of the signal.

The relationships of the AC voltages of FIG. 1 are shown in FIG. 3 where VO(AC) is shown in equation (1) to be a function of the AC output detector current divided by the DC output detector current times the reference DC voltage or, by substitution, the output voltage VO(AC) equals the AC input voltage across the tip and ring leads of the loop multiplied by the DC reference voltage divided by the DC voltage of the tip and ring loop. Since both the AC voltage and DC voltage across the tip and ring attenuate as the loop becomes longer the output AC voltage VOAC has a tendency to remain at a constant magnitude thereby equalizing gain losses due to increased loop length.

For short loop length, attenuation of the loop is rather insensitive to frequency. However, as the loop becomes longer, signal attenuation varies sharply with frequency. This is shown in FIG. 7. In FIG. 7 we can see that at zero frequency (DC) for a loop of 7.5 kilofeet the loss would be, for example, under 5 dB. The loss for a loop of 15 kilofeet would be slightly over 5 dB. However, for a loop of 7.5 kilofeet and a frequency of, for example, 8 KHz the loss approaches 10 dB, while for 15 kilofeet at 8 KHz the loss is over 20 dB. Thus, as described by equation (2) of FIG. 3, it is seen that the AC voltage VTR(AC) of the loop drops faster than loop DC voltage VTR(DC). Accordingly, since the AC voltage is in the numerator of the equation, the net result is that the AC gain of the circuit will not be completely compensated at higher frequencies.

For example, using equation (2) of FIG. 3 in combination with FIG. 7 and assuming a loop length of 15 kilofeet and a frequency of 3 KHz the circuit of FIG. 1 would only compensate for approximately 6.5 dB of AC signal loss while the loss due to the frequency and loop length would be approximately 13 dB. Thus the circuit of FIG. 1 only partially compensates for the line loss.

If the frequency of the circuit is known to be relatively constant, then the DC reference voltage may be increased to an amount where the 13 dB loss is reinserted at the output. However, in situations where the signal frequency varies it is impractical to add 13 dB gain to the output circuit since if the frequency is decreased from 3 KHz to, for example, 2 KHz the gain would then be overpowering.

The circuit shown in FIG. 10 is arranged to correct for the increased loss due to frequency attenuation by introducing into the DC control signal, via multipliers 10M2 and 10M3, a complex DC voltage which is dependent on loop length in a manner so that the output circuit is compensated in accordance with the frequency received.

Prior to discussing FIG. 10 it will be helpful to study FIG. 5 where the input parameters to the circuit are shown in a theoretical manner.

FIG. 5 shows a more detailed representation of FIG. 1 where the input parameters are shown in a theoretical lumped parameter configuration. This lumped parameter model is good for voice frequency transmission (300 Hz–3000 Hz) up to 15 kilofeet loop. As shown in FIG. 5, r is representative of the resistance of unit length of the transmission line, c is the capacitance per unit length, l is the actual loop length and s is the Laplace transformation parameter. Thus the lumped capacitive value is shown to be frequency dependent. The circuit of FIG. 5 operates in exactly the same manner as discussed for FIG. 1 such that input DC current is provided via amplifier 5A1 to light emitting diode 5LED1. The AC input signal is also provided to light emitting diode 5LED1. These signals are in turn passed across the light barrier and received by photodetector diode 5LDD2.

As discussed previously, the DC component of the output voltage VX contains the AC input signal as well as a first DC component voltage based on the transfer characteristics of the output coupled device and a second component based upon the input DC voltage level.

FIG. 6 shows the equations of FIG. 5 and it can be seen by equation (1) of FIG. 6 that the AC output voltage VO(AC) is a function of the input voltage VS times several terms which are loop length and frequency dependent. Since the frequency component is in the denominator it is clear that as the frequency increases the AC output signal will decrease as previously discussed and thus the circuit of FIG. 3 does not provide frequency equalization.

FIG. 8 is an analog signal processor 801 which operates such that from three DC inputs, such as 1.07 V, 1 V, and V1(DC) there will be generated two outputs VO1 and VO2. The input voltages are arranged such that VO1 equals rl and VO2 equals $r^2l^2$ when the input voltage V1(DC) is of the form shown in equation (1) of FIG. 9.

Turning now to FIG. 10 there is shown a circuit which compensates both for the attenuation due to loop length resistance as well as the attenuation due to the frequency component. As shown in FIG. 10 the lumped parameters are again defined as before for FIG. 5. Note that certain signals are provided to analog signal processor 1001. These signals are in accordance with the discussion pertaining to FIG. 8. As shown in FIG. 10, there are three components of the current which is provided to the photodiode 10LDD1. The first component is provided via resistor capacitor combination 10C3 and 10R11, which component is the same as discussed for FIGS. 1 and 5 and is based upon the DC and AC components of the input signal. The second component of the signal applied to photodiode 10LDD1 via capacitor CA which is a function of the loop resistance and loop length and the third component of the signal is a function of the square of the above described signal and is applied via capacitor CB. The second and third components of the signal carry the variable loop length capacitance information and are used to compensate for frequency attenuation. These values, which depend on the compound voltages VO1 and VO2, can be adjusted to provide any desired frequency response. As discussed, these three signals are passed through the optocoupled device 101 across the barrier to provide an output signal VO(AC) controlled by the reference voltage VREF(DC). The equations pertaining to FIG. 10 are shown in FIG. 11 where as is shown in equation (1) thereof both the numerator and the denominator contain frequency components in the same form. Therefore the output signal VO(AC) is no longer frequency dependent and thus substantially compensated for by the circuit shown in FIG. 10.

For different line parameters r and c, we can select $K_2$, $C_1$ and $C_2$ so that $K_2 + SC_1rl + SC_2r^2l^2$ equals or approaches $1 + \frac{1}{2}sclR$.

Thus, since the frequency components of equation (1) FIG. 11 in both the numerator and denominator are of the same form, frequency compensation is achieved in good approximation.

For the purpose of showing the best mode contemplated by us at this time for practicing our invention, FIGS. 12–22 have been provided. FIG. 12 is an overall block diagram showing how our invention may be used in a telephone system to connect a central office loop with a station 1208. As shown, the central office line side of our invention is shown in Block 1202 and the output side of the barrier as shown in Block 1203 connected to any type of well known switching network shown in Block 1204, which network may advantageously be a mechanical crosspoint network or an electronic network. An example of such a network is the network shown in U.S. Pat. No. 3,991,279 dated Nov. 9, 1976, issued to D. J. Morgan, et al or in the J. J. Shanley application, Ser. No. 846,162, filed October 27, 1977.

On the station side of the crosspoint network an identical circuit configuration is shown in Blocks 1205 and 1206. Using the block diagram of FIG. 12 it can be seen that an optocoupled barrier is placed both before the switching network and after the switching network for maximum protection of the telephone system.

In FIG. 13, which is equivalent to the input side of the circuit shown in FIG. 4, there is shown an extended block diagram of Block 1202 showing several of the circuits necessary for operating our device. Current generator and shunt regulator 1302 is arranged to supply current to the LED driver. High accuracy voltage regulation is derived from the band gap voltage and current reference and serves as a floating voltage source.

Voltage and current reference 1303 is arranged to generate highly accurate, temperature insensitive, voltage and current references for use by the other circuits. This circuit would typically use the well-known band gap reference technique.

Circuit 1303, in combination with circuit 1302, is the equivalent of voltage regulator 20 shown in the circuit of FIG. 4.

Signal inverter and voltage to current converter 1304 is arranged to provide the reciprocal of the incoming signal. This circuit operates to convert the input signal voltage to the current form for use by divider 1305. Divider 1305 is arranged to accept the inverted signal current and to perform analog division thereon. This circuit operates to automatically adjust AC transmission gain and, in conjunction with signal inverter 1304, is the equivalent of elements 4M2 and 4A5 of the circuit shown in FIG. 4.

Modulator 1306 operates to modulate the AC signal current transmitted from the network to the central office thereby driving the loop, and includes element 401.

Hybrid and clamp circuit 1307 serves the normal hybrid cancellation function and includes elements 4R1 and 4R2 of the circuit shown in FIG. 4. The clamp circuit limits the AC gain for very long loops.

LED driver 1308 is arranged to drive the LEDs and includes elements 4A1 and 4LED1 of the circuit shown in FIG. 4.

The network line circuit 1401 shown in FIG. 14 is the equivalent of the circuitry shown in the circuit of FIG. 4 where LED driver 1404 includes elements 4A4 and 4LED1R. Hybrid 1405 includes elements 4R11 and 4R21. Modulator 1406 includes element 4Q2. Divider 1407 includes elements 4A3 and 4M1.

The station side of the optocoupled station circuit shown in FIG. 15 is substantially a mirror image of the circuitry described with respect to FIG. 13.

The circuit of FIG. 4 performs the hybrid function in the same manner as does that of U.S. Pat. No. 4,005,615, dated Aug. 30, 1977, in conjunction with the Morgan et al patent abovereferenced.

FIGS. 16–22 have been provided to show one construction of the details of our circuit. These details have been provided to comply with the best mode requirements. These circuits were designed by others for use in our optocoupled hybrid circuit so that we could package our invention in a commercially acceptable manner. However, it should be pointed out that the invention has been fully described with reference to FIGS. 1 through 15 and only when it is desired to use our invention in a particular embodiment and for a particular purpose with stringent other requirements does it become necessary to resort to the circuitry and block diagrams shown in FIGS. 16–22 which do not include frequency compensation.

It is contemplated that the circuitry discussed in FIGS. 16-22 would be implemented entirely in large scale integrated circuit fashion. Thus, since each application of the inventive concept as well as each manufacturing technique would by necessity require different circuit implementation predicated on the inventive concepts disclosed and discussed in detail with reference to FIGS. 1 through 15 a detailed circuit analysis of the circuits of FIGS. 16-22 has not been undertaken herein.

Conclusion

Only a few of the possible uses of our device have been discussed herein. There is no doubt that one skilled in the art will be able to utilize our invention advantageously in a variety of circuit configurations both in conjunction with a telephone system and for other purposes where isolation is necessary between an input and an output or in situations where the gain of a circuit must be automatically controlled dependent upon loop length or frequency considerations.

We have shown a circuit for loop length and frequency compensation where the gain is held to a constant level. However, it may be desirable to increase gain with frequency or loop length or to provide a special frequency response. To do so would only require a different control function for the compound voltage discussed herein.

What is claimed is:

1. An optocoupled device having an input terminal and an output terminal said terminals separated by a photocoupled barrier, the input side of said barrier containing phototransmitting means operable for providing phototransmission across said barrier in accordance with input AC and DC transmission signals, and the output side of said barrier containing photodetecting means operable under control of received phototransmission for providing an output transmission signal representative of said input transmission signal, said device including
   means on said input side of said barrier for generating a bias signal proportional to said input DC signal,
   means for applying said generated bias signal to said phototransmitting means so that one component of said phototransmission across said barrier is a function of said input DC transmission signal as well as a function of the physical characteristics of the light transfer across said barrier,
   means for comparing a reference DC voltage level to a DC voltage level generated by said photodetecting means as a result of received phototransmission, and
   means on said output side of said barrier for modifying the AC gain of said output transmission signal in accordance with said compared voltage levels.

2. The invention set forth in claim 1 further comprising means on said input side of said barrier for generating a signal component from the lumped parameters of a circuit connected to said input,
   means for applying said generated signal component to said phototransmitting means so that another component of said phototransmission across said barrier is a function of said generated signal component,
   said modifying means including means for applying said generated signal component to said output AC transmission signal to correct the output AC gain of said output transmission signal for desired frequency modification.

3. The invention set forth in claim 2 wherein said lumped parameters are l and r, where l is the loop length of said connected circuit and r is the resistance of said connected circuit, said generated signal component including an analog signal processor circuit operable to provide a first voltage VO1 and a second voltage VO2 where said first voltage has the form rl and said second voltage has the form $r^2 l_2$.

4. A variable telephone loop length optocoupled isolation circuit having an input terminal connectable to said telephone loop and an output terminal connectable to a telephone station circuit said terminals separated by a photocoupled barrier, the input side of said barrier containing phototransmitting means operable for providing phototransmission across said barrier in accordance with input transmission signals, and the output side of said barrier containing photodetecting means operable under control of received phototransmission for providing an output transmission signal representative of said input transmission signal,
   means on said input side of said barrier for generating a DC voltage proportional to the length of said telephone loop,
   means for applying said generated DC voltage to said phototransmitting means so that the DC component of said phototransmission across said barrier is a function of said loop length as well as a function of the physical characteristics of the light transfer across said barrier,
   means for comparing a reference DC voltage level to a DC voltage level generated by said photodetecting means as a result of received phototransmission, and
   means for modifying the gain of said output transmission signal in accordance with said compared voltage levels.

5. The invention set forth in claim 4 further comprising means on said input side of said barrier for generating a signal component from the lumped parameters l and r, of said telephone loop, where l is the loop length and r is the resistance of said telephone loop,
   means for applying said generated signal component to said phototransmitting means so that another component of said phototransmission across said barrier is a function of said generated signal component,
   said modifying means including means for applying said generated signal component to said output AC transmission signal to correct the output AC gain of said output transmission signal for frequency attenuation due to the length of said telephone loop.

6. The invention set forth in claim 5 wherein said generated component signal includes an analog signal processor circuit operable to provide a first voltage VO1 and a second voltage VO2 where said first voltage has the form rl and said second voltage has the form $r^2 l^2$.

7. A telephone communication system having a telephone central office transmission line connectable to a telephone station set via a switching network, said communication system including a circuit for isolating said transmission line from said switching network, said isolation circuit comprising
   an input terminal for connection to said transmission line and an output terminal for connecting to said switching network, said terminals separated by a photocoupled barrier, the input side of said barrier containing phototransmitting means operable for providing phototransmission across said barrier in accordance with input AC and DC transmission signals on said transmission line, and the output side of said barrier containing photodetecting means operable under control of received phototransmission for providing an output transmission signal representative of said input transmission signal, means on said input side of said barrier for generating a bias signal proportional to said input DC signal, means for applying said generated bias signal to said phototransmitting means so that one component of said phototransmission across said barrier is a function of said input DC transmission signal as well as a function of the physical characteristics of the light transfer across said barrier, means for comparing a reference DC voltage level to a DC voltage level generated by said photodetecting means as a result of received phototransmission, and means on said output side of said barrier for modifying the AC gain of said output transmission signal in accordance with said compared voltage levels.

8. The invention set forth in claim 7 further comprising a second isolation circuit for connection between said switching network and said telephone station set, said second isolation circuit comprising a second input connectable to said station set and a second output connectable to said switching network, said terminals separated by a second photocoupled barrier, said second input side of said barrier containing second phototransmitting means operable for providing phototransmission across said second barrier in accordance with second input transmission signals, and said second output side of said barrier containing second photodetecting means operable under control of received phototransmission for providing a second output transmission signal representative of said second input transmission signal, means on said second input side of said barrier for generating a second DC bias signal, means for applying said second generated bias signal to said second phototransmitting means, means for comparing a second reference DC voltage level to a second DC voltage level generated by said second photodetecting means as a result of received phototransmission, and means for modifying the AC gain of said second output transmission signal in accordance with said compared voltage levels.

9. The invention set forth in claim 8 wherein said input generated bias signal contains a component generated from the lumped parameters l and r, of said telephone line, where l is the loop length of said telephone line and r is the resistance of said telephone line, said modifying means including means for applying said generated signal component to said output AC transmission signal to correct the output AC gain of said output transmission signal for frequency attenuation due to the length of said transmission line.

10. The invention set forth in claim 9 wherein said generated signal component includes an analog signal processor circuit operable to provide a first voltage VO1 and a second voltage VO2 where said first voltage has the form rl and said second voltage has the form $r^2l^2$.

11. An isolation device having an input terminal and an output terminal said terminals separated by an interface, the input side of said interface containing transmitting means operable for providing transmission across said interface in accordance with input AC and DC transmission signals, and the output side of said interface containing detecting means operable under control of received transmission for providing an output transmission signal representative of said input transmission signal, said device including means on said input side of said interface for generating a bias signal proportional to said input DC signal, means for applying said generated bias signal to said transmitting means so that one component of said transmission across said interface is a function of said input DC transmission signal as well as a function of the physical characteristics of said interface, means for comparing a reference DC voltage level to a DC voltage level generated by said detecting means as a result of transmission received across said interface, said means on said output side of said interface for modifying the AC gain of said output transmission signal in accordance with said compared voltage levels.

12. The invention set forth in claim 11 further comprising means on said input side of said interface for generating a signal component from the lumped parameters of a circuit connected to said input, means for applying said generated signal component to said transmitting means so that another component of said transmission across said interface is a function of said generated signal component, said modifying means including means for applying said generated signal component to said output AC transmission signal to correct the output AC gain of said output transmission signal for desired frequency modification.

13. The invention set forth in claim 12 wherein said lumped parameters are l and r, where l is the loop length of said connected circuit and r is the resistance of said connected circuit, said generated signal component including an analog signal processor circuit operable to provide a first voltage VO1 and a second voltage VO2 where said first voltage has the form rl and said second voltage has the form $r^2l^2$.

14. A variable telephone loop length isolation circuit having an input terminal connectable to said telephone loop and an output terminal connectable to a telephone station circuit said terminals separated by an isolation interface, the input side of said interface containing transmitting means operable for providing transmission across said interface in accordance with input transmission signals, and the output side of said interface containing detecting means operable under control of transmission received across said interface for providing an output transmission signal representative of said input transmission signal, means on said input side of said interface for generating a DC voltage proportional to the length of said telephone loop, means for applying said generated DC voltage to said transmitting means so that the DC component of said transmission across said interface is a function of said loop length as well as a function of the physical characteristics of said barrier, means for comparing a reference DC voltage level to a DC voltage level generated by said detecting means as a result of transmission received across said interface, and means for modifying the gain of said output transmission signal in accordance with said compared voltage levels.

15. The invention set forth in claim 14 further comprising means on said input side of said interface for generating a signal component from the lumped parameters l and r, of said telephone loop, where l is the loop length and r is the resistance of said telephone loop, means for applying said generated signal component to said transmitting means so that another component of said transmission across said interface is a function of said generated signal component, said modifying means including means for applying said generated signal component to said output AC transmission signal to correct the output AC gain of said output transmission signal for frequency attenuation due to the length of said telephone loop.

16. The invention set forth in claim 15 wherein said generated component signal includes an analog signal processor circuit operable to provide a first voltage VO1 and a second voltage VO2 where said first voltage has the form rl and said second voltage has the form $r^2l^2$.

* * * * *